United States Patent
Ben Henda et al.

(10) Patent No.: US 10,638,412 B2
(45) Date of Patent: Apr. 28, 2020

(54) IMPLICIT SPATIAL REPLAY PROTECTION

(71) Applicant: Telefonaktiebolaget LM Ericsson (publ), Stockholm (SE)

(72) Inventors: Noamen Ben Henda, Stockholm (SE); Vesa Lehtovirta, Espoo (FI); Katharina Pfeffer, Graz (AT); Shabnam Sultana, Montreal (CA); Vesa Torvinen, Sauvo (FI); Monica Wifvesson, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/069,943

(22) PCT Filed: Nov. 24, 2016

(86) PCT No.: PCT/EP2016/078655
§ 371 (c)(1),
(2) Date: Jul. 13, 2018

(87) PCT Pub. No.: WO2017/129287
PCT Pub. Date: Aug. 3, 2017

(65) Prior Publication Data
US 2019/0069227 A1 Feb. 28, 2019

Related U.S. Application Data

(60) Provisional application No. 62/286,597, filed on Jan. 25, 2016.

(51) Int. Cl.
*H04W 12/06* (2009.01)
*H04W 48/16* (2009.01)
(Continued)

(52) U.S. Cl.
CPC ........... *H04W 48/16* (2013.01); *H04W 4/021* (2013.01); *H04W 4/023* (2013.01); *H04W 4/029* (2018.02); *H04W 12/10* (2013.01); *H04W 76/14* (2018.02)

(58) Field of Classification Search
CPC ....... H04W 4/02; H04W 64/00; H04W 48/16; H04W 4/029; H04W 4/023; H04W 76/14;
(Continued)

(56) References Cited

U.S. PATENT DOCUMENTS 8,774,032 B2 7/2014 Vialen et al.
9,043,602 B1 5/2015 Krieger et al.
(Continued)

FOREIGN PATENT DOCUMENTS

RU 2013154418 A 6/2015

OTHER PUBLICATIONS

3GPP, "3GPP TR 23.713 V13.0.0 (Sep. 2015)", 3rd Generation Partnership Project; Technical Specification Group Services and System Aspects; Study on extended architecture support for proximity-bases services (Release 13), Sep. 2015, pp. 1-80.
(Continued)

*Primary Examiner* — Dai Phuong
(74) *Attorney, Agent, or Firm* — Murphy, Bilak & Homiller, PLLC

(57) ABSTRACT

A terminal device obtains grid location information relating to a cell of a predetermined grid in which the terminal device is located. The terminal device then calculates a message integrity code based on the grid location information and transmits a proximity service discovery message. The discovery message includes the calculated message integrity code and does not include the grid location information. A second terminal device receives the proximity service discovery message. The second terminal device then obtains
(Continued)

grid location information relating to at least one cell of a predetermined grid within a predetermined distance of a location of the second terminal device, calculates at least one message integrity code based on the grid location information, and determines whether a calculated message integrity code matches the message integrity code in the received discovery message. The second terminal device then acts on the received discovery message only if there is a match.

12 Claims, 10 Drawing Sheets

(51) Int. Cl.
*H04W 76/14* (2018.01)
*H04W 4/021* (2018.01)
*H04W 12/10* (2009.01)
*H04W 4/029* (2018.01)
*H04W 4/02* (2018.01)

(58) Field of Classification Search
CPC .............. H04W 4/021; H04W 12/10; H04L 29/08657; H04L 29/08108; H04L 29/08936; G01S 5/0252; G01S 5/02; G01S 5/14; G01C 21/20; H04M 1/72572
USPC ................... 455/410–411, 457, 456.1–456.3
See application file for complete search history.

(56) References Cited

U.S. PATENT DOCUMENTS

| | | | | |
|---|---|---|---|---|
| 9,820,105 | B2 * | 11/2017 | Snyder | H04W 4/021 |
| 10,034,215 | B2 * | 7/2018 | Zhang | H04W 12/06 |
| 2004/0142710 | A1 * | 7/2004 | Liang | H04L 63/123 |
| | | | | 455/466 |
| 2006/0193299 | A1 | 8/2006 | Winget et al. | |
| 2009/0022152 | A1 * | 1/2009 | Henry | H04L 29/1233 |
| | | | | 370/389 |
| 2014/0031028 | A1 | 1/2014 | Yamada et al. | |
| 2014/0056220 | A1 | 2/2014 | Poitau et al. | |
| 2014/0162687 | A1 | 6/2014 | Edge | |
| 2014/0192766 | A1 | 7/2014 | Akisada et al. | |
| 2014/0244329 | A1 * | 8/2014 | Urban | G06Q 10/06311 |
| | | | | 705/7.15 |
| 2015/0015441 | A1 | 1/2015 | Chiou et al. | |
| 2015/0042447 | A1 * | 2/2015 | Vogt | G08C 23/04 |
| | | | | 340/4.41 |
| 2015/0271675 | A1 * | 9/2015 | Cheng | H04W 8/005 |
| | | | | 455/410 |
| 2015/0334550 | A1 | 11/2015 | Klatt et al. | |
| 2015/0339718 | A1 | 11/2015 | Walton et al. | |
| 2015/0341794 | A1 | 11/2015 | Vanderveen et al. | |
| 2016/0128116 | A1 | 5/2016 | Kim et al. | |
| 2016/0242029 | A1 | 8/2016 | Agiwal et al. | |
| 2016/0302137 | A1 | 10/2016 | Escott et al. | |
| 2017/0289154 | A1 * | 10/2017 | Krieger | H04W 12/06 |
| 2017/0374549 | A1 * | 12/2017 | Anil | H04W 8/00 |
| 2018/0199388 | A1 * | 7/2018 | Tabet | H04W 76/14 |
| 2018/0234827 | A1 | 8/2018 | Stojanovski et al. | |
| 2018/0279394 | A1 * | 9/2018 | Peng | H04L 29/06 |
| 2019/0080353 | A1 * | 3/2019 | Bleecher Snyder | H04W 4/02 |

OTHER PUBLICATIONS

3GPP, "3GPP TS 22.042 V12.0.0 (Oct. 2014)", 3rd Generation Partnership Project; Technical Specification Group Services and System Aspects; Network Identity and TimeZone (NITZ); Service description; Stage 1 (Release 12), Oct. 2014, pp. 1-8.

3GPP, "3GPP TS 22.278 V13.1.0 (Sep. 2014)", 3rd Generation Partnership Project; Technical Specification Group Services and System Aspects; Service requirements for the Evolved Packet System (EPS) (Release 13), Sep. 2014, pp. 1-45.

3GPP, "3GPP TS 22.278 V13.2.0 (Dec. 2014)", 3rd Generation Partnership Project; Technical Specification Group Services and System Aspects; Service requirements for the Evolved Packet System (EPS) (Release 13), Dec. 2014, pp. 1-46.

3GPP, "3GPP TS 23.303 V12.4.0 (Mar. 2015)", 3rd Generation Partnership Project; Technical Specification Group Services and System Aspects; Proximity-based services (proSe); Stage 2 (Release 12), Mar. 2015, pp. 1-63.

3GPP, "3GPP TS 23.303 V13.0.0 (Jun. 2015)", 3rd Generation Partnership Project; Technical Specification Group Services and System Aspects; Proximity-based services (ProSe); Stage 2 (Release 13), Jun. 2015, pp. 1-97.

3GPP, "3GPP TS 23.303 V13.2.0 (Dec. 2015)", 3rd Generation Partnership Project; Technical Specification Group Services and System Aspects; Proximity-based services (ProSe); Stage 2 (Release 13), Dec. 2015, pp. 1-122.

3GPP, "3GPP TS 23.303 V13.3.0 (Mar. 2016)", 3rd Generation Partnership Project; Technical Specification Group Services and System Aspects; Proximity-based services (ProSe); Stage 2 (Release 13), Mar. 2016, pp. 1-124.

3GPP, "3GPP TS 36.300 V13.2.0", 3rd Generation Partnership Project; Technical Specification Group Radio Access Network; Evolved Universal Terrestrial Radio Access (E-UTRA) and Evolved Universal Terrestrial Radio Access getwork (E-UTRAN); Overall description; Stage 2 (Release 13), Dec. 2015, pp. 1-290.

3GPP, "3GPP TS 36.300 V13.3.0 (Mar. 2016)", 3rd Generation Partnership Project; Technical Specification Group Radio, Access Network; Evolved Universal Terrestrial Radio Access (E-UTRA) and Evolved Universal Terrestrial Radio 4ccess Network (E-UTRAN); Overall description; Stage 2 (Release 13), Mar. 2016, pp. 1-295.

Ericsson, "Spatial Replay Protection Mechanisms for ProSe Discovery", 2GPP TSG-SA WG3 Meeting #82, S3-160179, Dubrovnik, Croatia, Feb. 1-5, 2016, pp. 1-6.

3GPP, "3GPP TS 22.278 V13.0.0 (Jun. 2014)", 3rd Generation Partnership Project; Technical Specification Group Services and System Aspects; Service requirements for the Evolved Packet System (EPS) (Release 13), Jun. 2014, pp. 1-45.

\* cited by examiner

IMPLICIT SPATIAL REPLAY PROTECTION

TECHNICAL FIELD

This invention relates to methods of operation of a terminal device and a network node in a cellular communications network.

BACKGROUND

Proximity Services (ProSe) are new features of a 3GPP communications network, providing services for ProSe-enabled user equipment devices (UEs) in proximity of each other. These features are standardized in TS 22.278 v13.0.0 and TS 23.303 v13.0.0.

ProSe features consist of ProSe discovery and ProSe direct communication. ProSe discovery identifies ProSe-enabled UEs in proximity of each other. ProSe direct communication enables the establishment of communication paths between ProSe-enabled UEs in direct communication range.

One issue with the current protocol is that it may be possible for an attacker to listen on the air interface at a first location, collect discovery messages broadcast by a first UE, and broadcast the discovery messages from a second location. A second UE, in the vicinity of the second location, can be deceived into believing that it is in the vicinity of the first UE. This has been described as the spatial replay problem.

SUMMARY

According to the present invention there is provided a method. The method comprises: obtaining grid location information relating to a cell of a predetermined grid in which the terminal device is located; calculating a message integrity code based on the grid location information; and transmitting a proximity service discovery message. The discovery message may include the calculated message integrity code and does not include the grid location information.

According to the present invention there is provided a terminal device for use in a cellular communications network. The terminal device is adapted for: obtaining grid location information relating to a cell of a predetermined grid in which the terminal device is located; calculating a message integrity code based on the grid location information; and transmitting a proximity service discovery message. The discovery message may include the calculated message integrity code and does not include the grid location information.

According to the present invention there is provided a terminal device for use in a cellular communications network. The terminal device comprises a processor, and a memory, the memory containing instructions executable by the processor, such that the terminal device is operable to: obtain grid location information relating to a cell of a predetermined grid in which the terminal device is located; calculate a message integrity code based on the grid location information; and transmit a proximity service discovery message. The discovery message may include the calculated message integrity code and does not include the grid location information.

According to the present invention there is provided a terminal device for use in a cellular communications network. The terminal device comprising an information module for obtaining grid location information relating to a cell of a predetermined grid in which the terminal device is located; a calculating mode calculating a message integrity code based on the grid location information; and a transmitting module for transmitting a proximity service discovery message. The discovery message may include the calculated message integrity code and does not include the grid location information.

According to the present invention there is provided a method. The method comprises receiving a proximity service discovery message containing a message integrity code; obtaining grid location information relating to at least one cell of a predetermined grid within a predetermined distance of a location of the terminal device; calculating at least one message integrity code based on the grid location information; determining whether a calculated message integrity code matches the message integrity code in the received discovery message. The method also comprises acting on the received proximity service discovery message only if a calculated message integrity code matches the message integrity code in the received discovery message.

According to the present invention there is provided a terminal device for use in a cellular communications network. The terminal device is adapted for receiving a proximity service discovery message containing a message integrity code; obtaining grid location information relating to at least one cell of a predetermined grid within a predetermined distance of a location of the terminal device; calculating at least one message integrity code based on the grid location information; determining whether a calculated message integrity code matches the message integrity code in the received discovery message. The method also comprises acting on the received proximity service discovery message only if a calculated message integrity code matches the message integrity code in the received discovery message.

According to the present invention there is provided a terminal device for use in a cellular communications network. The terminal device comprises a processor, and a memory, the memory containing instructions executable by the processor, such that the terminal device is operable to: receive a proximity service discovery message containing a message integrity code; obtain grid location information relating to at least one cell of a predetermined grid within a predetermined distance of a location of the terminal device; calculate at least one message integrity code based on the grid location information; determine whether a calculated message integrity code matches the message integrity code in the received discovery message; and act on the received proximity service discovery message only if a calculated message integrity code matches the message integrity code in the received discovery message.

According to the present invention there is provided a terminal device for use in a cellular communications network. The terminal device comprises an information module for obtaining grid location information relating to at least one cell of a predetermined grid within a predetermined distance of a location of the terminal device; a calculation module for calculating at least one message integrity code based on the grid location information; a determinations module for determining whether a calculated message integrity code matches the message integrity code in the received discovery message; and an matching module for acting on the received proximity service discovery message only if a calculated message integrity code matches the message integrity code in the received discovery message.

According to the present invention there is provided a method of operation of a network node in a cellular communications network, the method comprising: receiving a request for proximity service resources from a terminal device; and sending a response to the terminal device granting the requested proximity service resources, with a requirement that the terminal device includes a message integrity code in any transmitted proximity service discovery message, wherein the message integrity code is calculated using grid location information relating to a cell of a predetermined grid in which the terminal device is located.

According to the present invention there is provided a network node for use in a cellular communications network, being adapted for: receiving a request for proximity service resources from a terminal device; and sending a response to the terminal device granting the requested proximity service resources, with a requirement that the terminal device includes a message integrity code in any transmitted proximity service discovery message, wherein the message integrity code is calculated using grid location information relating to a cell of a predetermined grid in which the terminal device is located.

According to the present invention there is provided a network node for use in a cellular communications network. The network node comprises a processor, and a memory, the memory containing instructions executable by the processor, such that the terminal device is operable to: receive a request for proximity service resources from a terminal device; and send a response to the terminal device granting the requested proximity service resources, with a requirement that the terminal device includes a message integrity code in any transmitted proximity service discovery message, wherein the message integrity code is calculated using grid location information relating to a cell of a predetermined grid in which the terminal device is located.

According to the present invention there is provided a network node for use in a cellular communications network. The network node comprises a receiving module for receiving a request for proximity service resources from a terminal device; and a transmitting module for sending a response to the terminal device granting the requested proximity service resources, with a requirement that the terminal device includes a message integrity code in any transmitted proximity service discovery message, wherein the message integrity code is calculated using grid location information relating to a cell of a predetermined grid in which the terminal device is located.

According to the present invention there is provided a computer program configures, when run on a computer, to carry out any of the previous methods. According to the present invention there is provided a computer program product comprising a computer readable medium and such a computer program.

DETAILED DESCRIPTION

Figure 1:
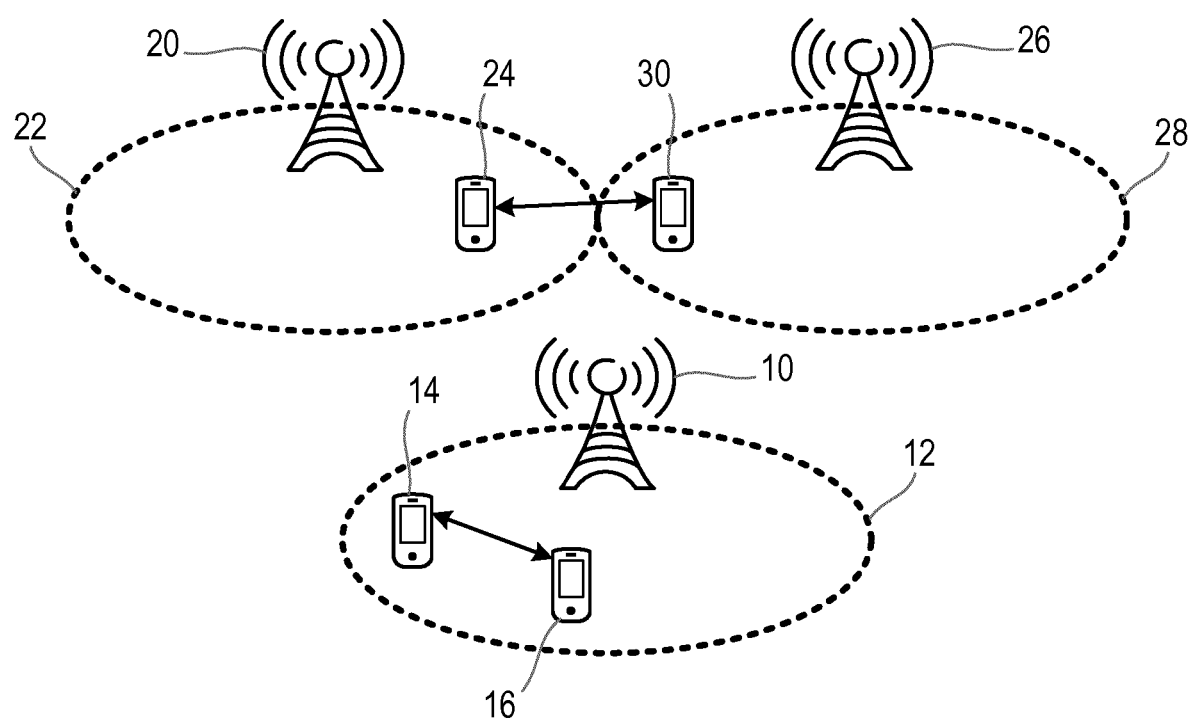
FIG. 1 illustrates a part of a cellular communications network.

The following sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for user equipment (UE), it should be understood by the skilled in the art that "UE" is a non-limiting term comprising any mobile or wireless device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile station" ("MS"), "mobile device" and "terminal device" may be used interchangeably in the following description, and it will be appreciated that such a device does not necessarily have to be 'mobile' in the sense that it is carried by a user. Instead, the term "mobile device" encompasses any device that is capable of communicating with communication networks that operate according to one or more mobile communication standards, such as the Global System for Mobile communications, GSM, UMTS, Long-Term Evolution, LTE, etc.

A cell is associated with a base station, where a base station comprises in a general sense any network node transmitting radio signals in the downlink (DL) and/or receiving radio signals in the uplink (UL). Some example base stations, or terms used for describing base stations, are eNodeB, eNB, NodeB, macro/micro/pico/femto radio base station, home eNodeB (also known as femto base station), relay, repeater, sensor, transmitting-only radio nodes or receiving-only radio nodes, or WLAN access point (AP). A base station may operate or at least perform measurements in one or more frequencies, carrier frequencies or frequency bands and may be capable of carrier aggregation. It may also be a single-radio access technology (RAT), multi-RAT, or multi-standard node, e.g., using the same or different base band modules for different RATs.

FIG. 1 illustrates a part of a cellular communications network, including a first base station 10, serving a cell 12, with a first wireless communications device (or UE) 14 and a second wireless communications device (or UE) 16 within the cell 12.

The cellular communications network shown in FIG. 1 also includes a second base station 20, serving a second cell 22, with a third wireless communications device (or UE) 24 within the cell 22, and a third base station 26, serving a third cell 28, with a fourth wireless communications device (or UE) 30 within the cell 28.

Each of the base stations 10, 20, 26 has a connection to a core network (not shown in FIG. 1) of the cellular communications network, as described in more detail below.

In the examples described herein, the devices taking part in the methods are described as user equipment devices (UEs). It will be understood that this term is used to refer to user-operated portable communications devices, such as smartphones, laptop computers or the like, to other portable devices, such as tracking devices or the like, and to devices that are primarily intended to remain stationary in use, such as sensors, smart meters or the like.

In the example shown in FIG. 1, the network forms part of an Evolved UMTS Terrestrial Radio Access Network (E-UTRAN), as defined by the 3$^{rd}$ Generation Partnership Project (3GPP). The 3GPP system provides the possibility of Proximity Services (ProSe) that can be used by User Equipment (UE) devices that are in proximity to each other. The ProSe system is described in 3GPP TS 22.278 v13.0.0 and 3GPP TS 23.303 v13.0.0. For example, the ProSe system allows the possibility of Device-to-Device (D2D) communication, without passing messages through the Radio Access Network.

One aspect of the ProSe system is the process of ProSe Discovery. The ProSe Discovery process identifies that ProSe-enabled UEs are in proximity of each other, using Evolved UMTS Terrestrial Radio Access (with or without using the E-UTRAN) or the Extended Packet Core (EPC) network, when permission, authorization and proximity criteria are fulfilled. The proximity criteria can be configured by the operator. One specific form of ProSe Discovery is ProSe Direct Discovery, which is a procedure employed by a ProSe-enabled UE to discover other ProSe-enabled UEs in its vicinity by using only the capabilities of the two UEs with E-UTRA technology.

The term ProSe-enabled UE refers to a UE that supports ProSe requirements and associated procedures. A ProSe-enabled UE may be either a non-Public Safety UE and/or a Public Safety UE.

FIG. 1 shows scenarios for D2D ProSe where two UEs 14, 16 are each located in coverage of the same cell 12 and where two UEs 24, 30 are located in coverage of different cells 22, 28.

The ProSe Discovery process can be used as a standalone process (i.e. it is not necessarily followed by ProSe Communication) or as an enabler for other services.

Figure 2:
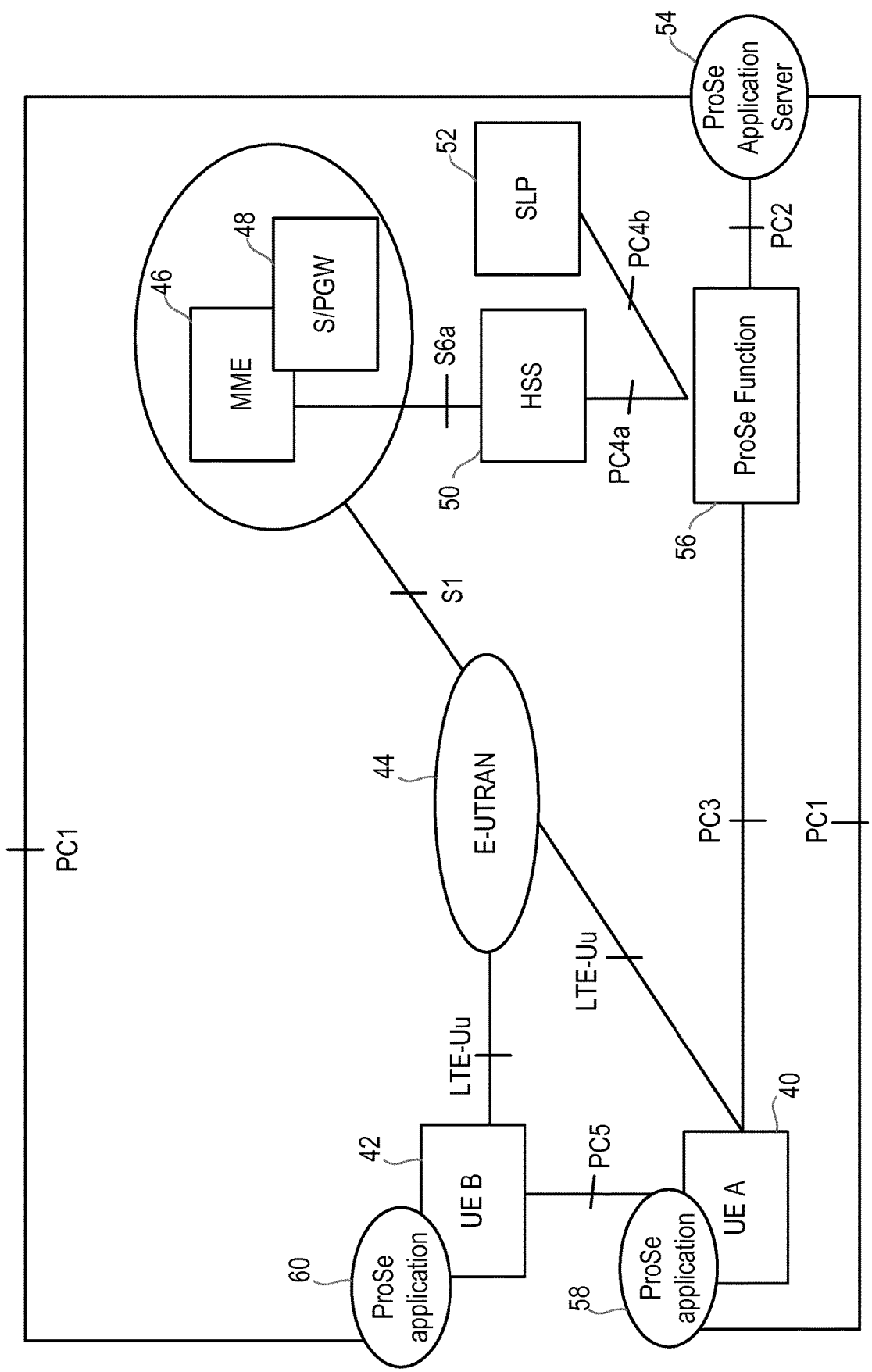
FIG. 2 illustrates another part of the cellular communications network of FIG. 1.

FIG. 2 is an illustration of the ProSe network architecture. In FIG. 2, it is assumed that two user equipment devices, UE A 40 and UE B 42, subscribe to the same Public Land Mobile Network (PLMN).

The two user equipment devices, UE A 40 and UE B 42, each have a respective connection over the LTE-Uu interface to the Evolved UMTS Terrestrial Radio Access Network (E-UTRAN) 44. An S1 interface connects the E-UTRAN to an Evolved Packet Core (EPC) network, which includes a Mobility Management Entity (MME) 46, Serving Gateway (SGW) and Packet Gateway (PGW) 48, Home Subscriber Server (HSS) 50, and Secure User Plane Location (SUPL) Location Platform (SLP) 52, amongst other network nodes.

The network also includes at least one Application server 54, which uses the ProSe capability for building the application functionality.

The core network also includes a ProSe Function 56, which provides functionality such as: Authorization and configuration of the UEs for discovery and direct communication (controlled by the ProSe Function in the user's Home PLMN in the non-roaming case and by the Home PLMN or Visited PLMN ProSe Function in the roaming case); enabling the functionality of the EPC level ProSe discovery; handling and storing of ProSe related new subscriber data and ProSe identities; and security related functionality.

The ProSe Function has a PC3 reference point towards each UE, and has a PC4 reference point towards the EPC.

The ProSe Function also has a PC2 reference point towards at least one ProSe Application Server, which uses the ProSe capability for building the application functionality.

Each UE includes a ProSe application 58, 60, which has a PC1 reference point towards the ProSe Application Server.

The UEs UE A and UE B use the PC5 reference point for control and user plane for discovery and communication, for relay and one-to-one communication (between UEs directly and between UEs over the LTE-Uu interface).

The ProSe Discovery process involves a discovery message being sent by one device, and received by another. The discovery message sent by a device includes an identifier.

It is proposed to include the location information in the computation of the MIC that is included in the ProSe discovery message, without enclosing the location information in the discovery message. The receiver would then have to guess which information was used in order to get a correct match of the MIC. It is proposed to use a "universal-coordinate-grid-cell" based approach for preprocessing location information so that the receiver can efficiently guess the correct location used in the calculation of the MIC.

Figure 3:
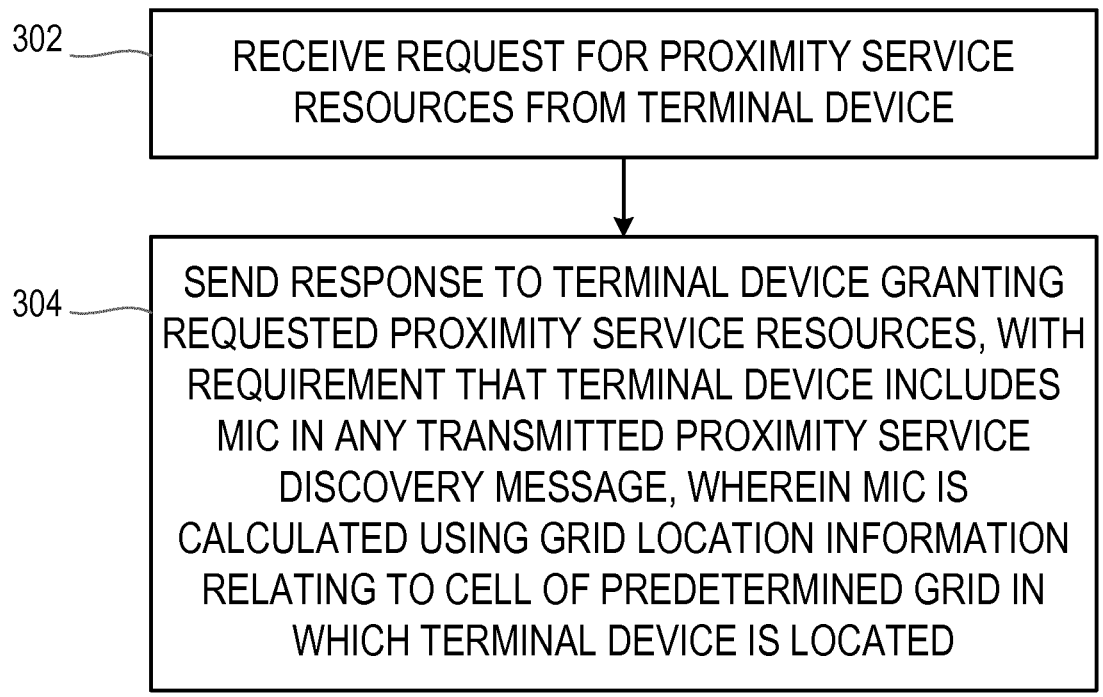
FIG. 3 is a flow chart illustrating a first process.

FIG. 3 is a flow chart, illustrating a process performed in a network node. Specifically, the process may be performed in the ProSe Function node 56 in a core network of a cellular communications network as shown in FIG. 2.

In step 302, the network node receives a request for proximity service resources from a terminal device such as a UE.

In step 304, the network node sends a response to the terminal device granting the requested proximity service resources, with a requirement that the terminal device includes a message integrity code (MIC) in any transmitted proximity service discovery message, wherein the message integrity code is calculated using grid location information relating to a cell of a predetermined grid in which the terminal device is located. The network node may additionally, either in this response or at an earlier or subsequent time, inform the terminal device of the predetermined grid to be used.

Figure 4:
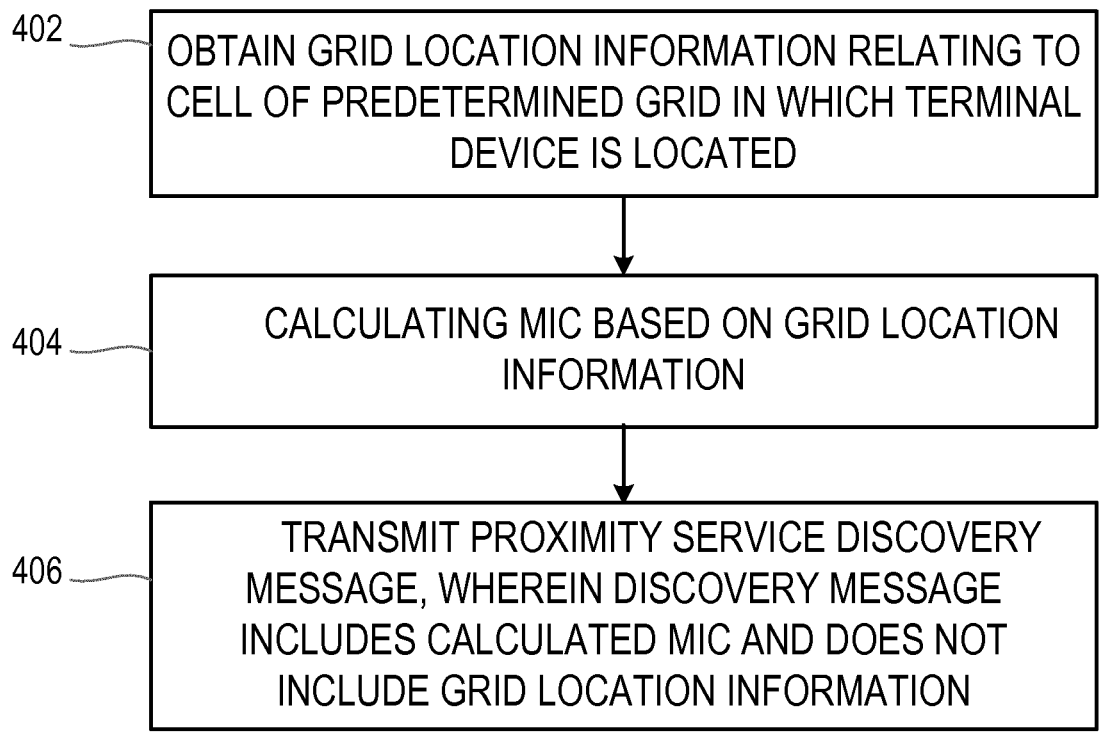
FIG. 4 is a flow chart illustrating a second process.

FIG. 4 is a flow chart, illustrating a process performed in a terminal device or UE that has been granted proximity service resources by a network node such as the ProSe Function node 56 in FIG. 2.

The UE determines that it wishes to send a discovery message over the PC5 reference point as shown in FIG. 2, for detection by at least one other UE. The content (payload) of the discovery message includes a message type indication, a ProSe Application Code, and a message integrity code.

As described in more detail below, the message integrity code is calculated using grid location information relating to a cell of a predetermined grid in which the terminal device is located.

Thus, in step 402, the terminal device obtains grid location information relating to a cell of a predetermined grid in which the terminal device is located. The terminal device may be provisioned with details of the predetermined grid, or a network node (for example the ProSe Function node 56 in FIG. 2) may inform the terminal device of the predetermined grid to be used, either in a response granting ProSe resources or separately.

The UE then obtains information relating to its location, for example in the form of Global Navigation Satellite System (GNSS) data such as Global Positioning System (GPS) data from a GPS receiver in the UE. The UE then determines in which grid cell it is currently located and computes the identifier of the current grid cell.

In step 404, the UE computes a message integrity code (MIC) using the formed content (that is, the payload of the proximity service discovery message) and the grid location information, for example the computed grid cell identifier.

In step 406, the UE forms the proximity service discovery message, including the calculated message integrity code but not including the grid location information. Thus, the final message may include the payload, the calculated MIC and any other required information (type, header, etc). The UE finally encodes and transmits the message.

As mentioned above, in some embodiments, GPS coordinates are used as the basis for the location information. Most modern devices have already built-in support for GPS. Furthermore for ProSe, a mechanism based on GPS coordinates has the advantage of working for both on and off-network modes and thus is relevant for public safety and even for the new 3GPP LTE-based system for vehicular communication (V2X).

The GPS coordinates are discretized according to a predefined grid, in the form of a coordinate grid. Based on its exact location, the receiver determines in which cell of the coordinate grid it is located. Then it uses the cell information rather than the exact location in the computation of the MIC. Similarly, as described in more detail below, the receiver UE determines in which cell it is located, based on its own exact location. Using this knowledge and information on the service range (for example 500 metres for ProSe), the receiver can guess in which cells the sender could have been located, namely the grid cells that are located within the service range from the receiver UE's location. Depending on the number of such potential relevant cells, the receiver might need several trials before obtaining a correct match for the MIC.

Figure 5:
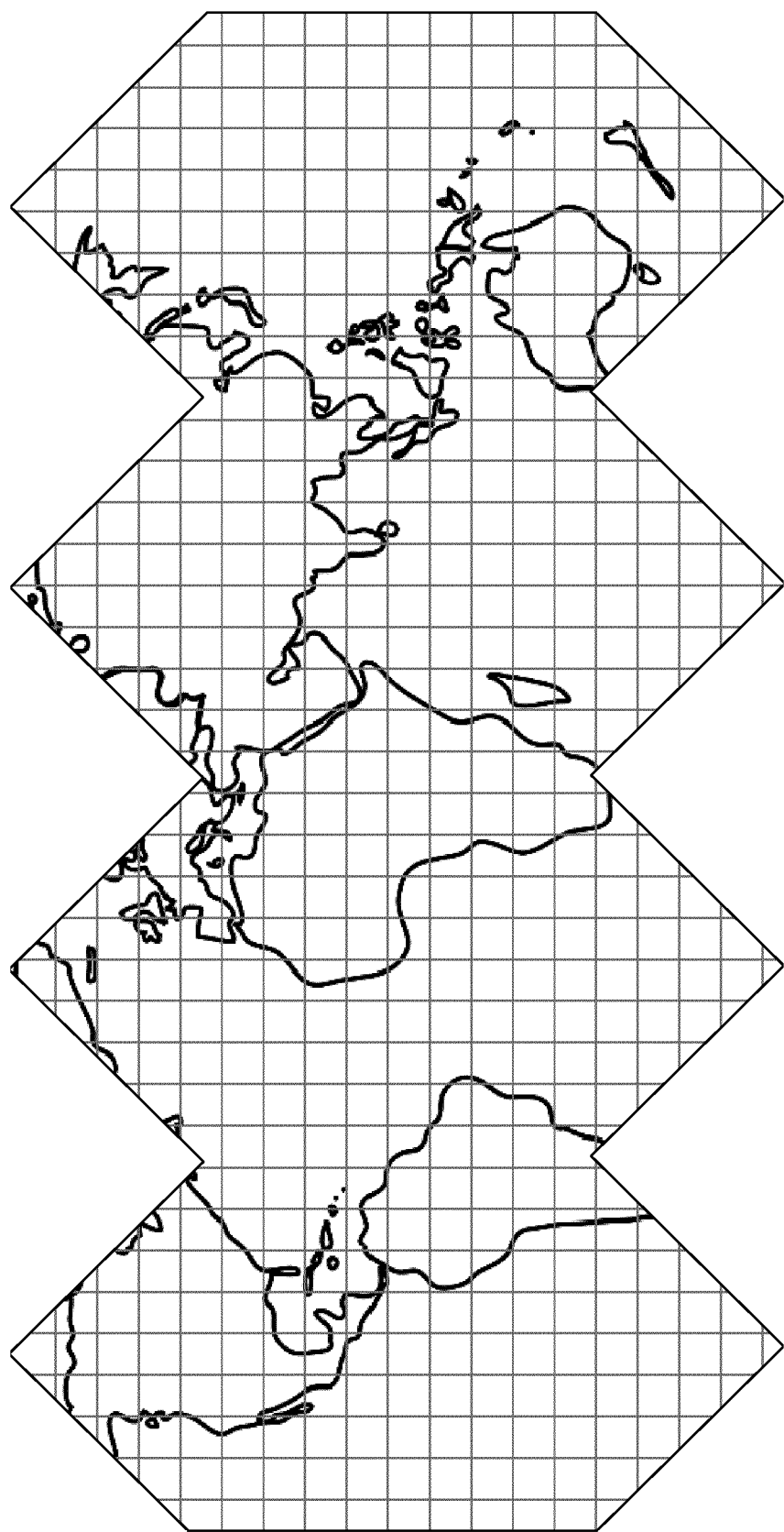
FIGS. 5 and 6 illustrate grids that can be used in the processes described herein.

FIG. 5 shows one possible form of the predetermined grid that can be used, in the form of the projection of what is known to be the "graticule", that is the grid formed by the latitude and longitude lines. These lines are the basis for the GPS coordinate systems where the reference for the longitude is the prime meridian at for the latitude is the equator.

The grid cells shown in FIG. 5 are of size 5 degrees by 5 degrees. This would correspond to areas whose sizes are of the order of thousands of square kilometers. For the proximity service, in embodiments, a grid based on that shown in FIG. 5, but with a considerably higher resolution could be used. One possibility is to use a grid in which each cell covers exactly a circle whose radius is the maximal range of the service. For ProSe, where the range is about 500 metres, this would yield a grid cell size in the order of few minutes of arc in each direction.

Figure 6:
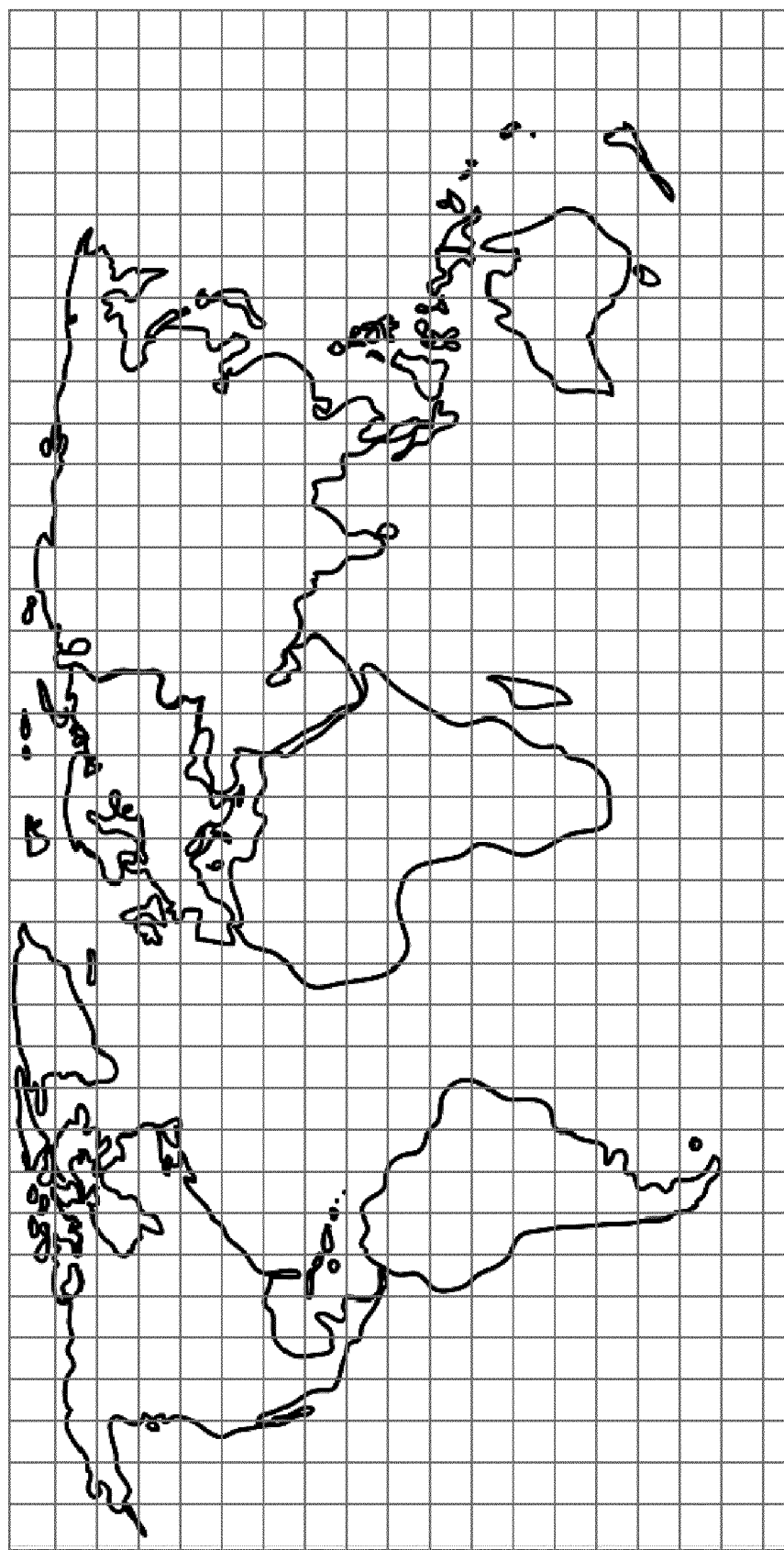

However, the gird obtained from the cylindrical projection as illustrated in FIG. 5 does not have cells of equal areas. Other types of projections that yield a grid where the cells cover equal size areas, for example the Healpix projection shown in FIG. 6, can be used in some embodiments.

Regardless of which coordinate system and which projection are used, a universal grid can be defined.

In embodiments, the predetermined grid comprises cells having linear dimensions that are of the same order of magnitude as a range of the proximity service. In more specific embodiments, the predetermined grid comprises square cells, each having side lengths that are approximately equal to double the range of the proximity service. That is, each cell of the predetermined grid covers a circle whose radius is the range of the proximity service.

For each cell, it is assumed that a unique public identifier can be computed. Such an identifier can be for example based on (for example being formed as the hash of) the coordinates of the corner to the north west of the cell, or the coordinates of the center of the cell, or any convenient identifier.

This geographical information, namely the list of cells with corresponding neighbors, identifiers and positions can be pre-provisioned in the devices and is unlikely to exceed few megabytes in size.

Figure 7:
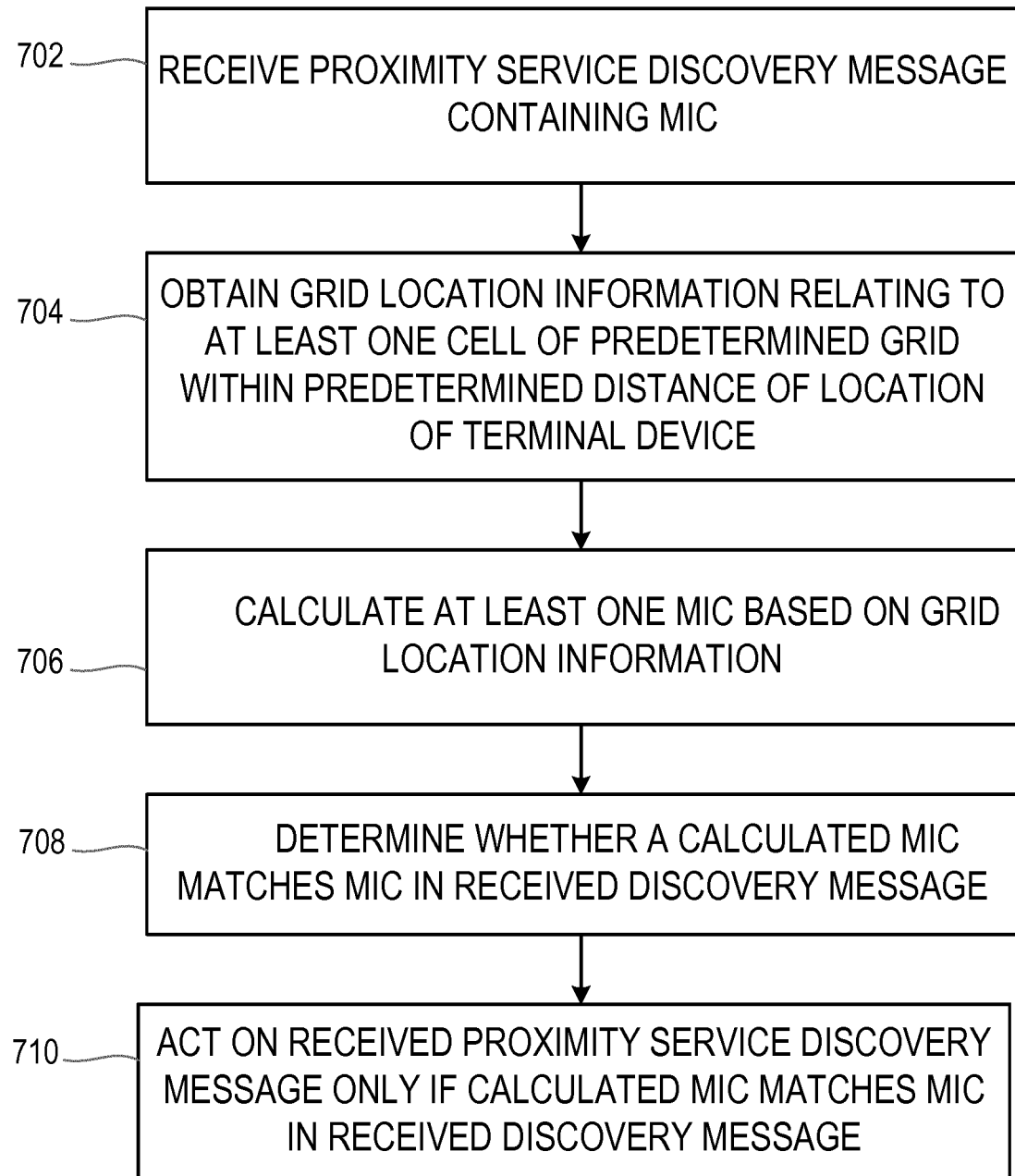
FIG. 7 is a flow chart illustrating a third process.

FIG. 7 is a flow chart, illustrating a process performed in a terminal device or UE that receives a discovery message. This receiving UE is now able to check that the sending UE is indeed in proximity.

In step 702, the UE receives the proximity services discovery message and decodes it. As mentioned previously, this discovery message contains a message integrity code (MIC).

In step 704, the UE obtains information relating to its location, for example in the form of Global Navigation Satellite System (GNSS) data such as Global Positioning System (GPS) data from a GPS receiver in the UE. The UE then determines in which grid cell it is currently located and computes the identifier of the current grid cell. In addition, it determines which neighboring cells fall within its proximity range and computes the identifiers of all these grid cells.

Figure 8:
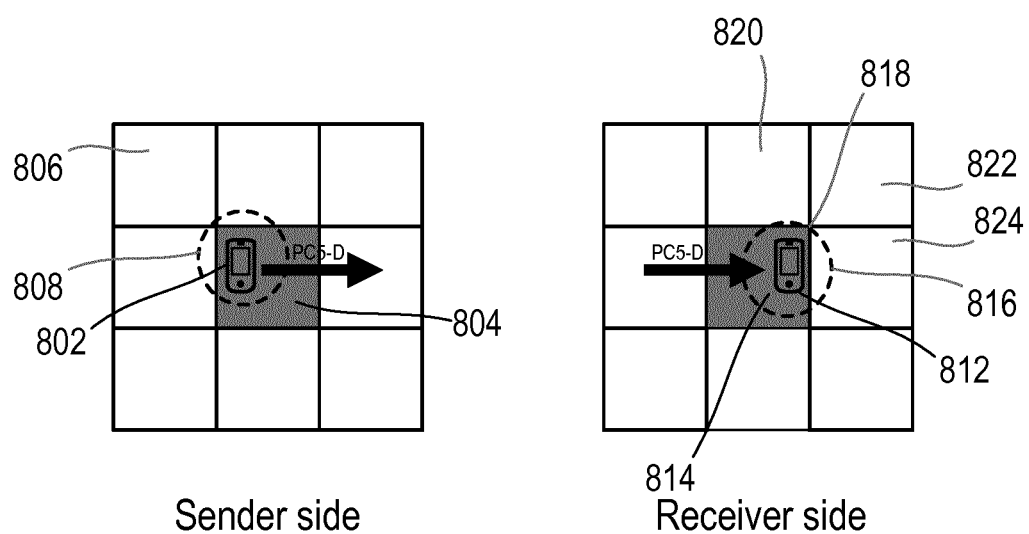
FIG. 8 illustrates a step in the third process.

FIG. 8 illustrates the neighboring cells that need to be identified by the UE.

Specifically, FIG. 8 shows the situation in which a sending UE 802 is located in a cell 804 of the predetermined grid. (It should be noted that there is no correspondence between cells of the predetermined grid and cells of the cellular communications network.) There are eight cells 806 etc surrounding the cell 804 in which the UE is located. A circle 808 is shown in FIG. 8, having a radius that is equal to the range of the proximity service. Thus, a discovery message PC5-D can be detected by any other UE located within the circle 808.

FIG. 8 also shows the situation in which a receiving UE 812 is located in a cell 814 of the predetermined grid. There are eight cells surrounding the cell 814 in which the UE is located. A circle 816 is shown in FIG. 8, having a radius that is equal to the range of the proximity service. Thus, when the receiving UE 812 receives a discovery message PC5-D, it can assume that that message was transmitted by another UE that was located within the circle 816.

The number of cells of the predetermined grid that lie at least partially within the circle 816 depends on the exact location of the UE 812 within the cell in which it is located, and also depends on the size of the grid cells, relative to the range of the proximity service.

Thus, in this illustrated example, where the the predetermined grid comprises square cells, each having side lengths that are approximately equal to double the range of the proximity service (such that each cell of the predetermined grid covers a circle whose radius is the range of the proximity service), if the receiving UE determined that it was located exactly at the center of the cell, it would know that the sending UE must also have been within the same cell of the predetermined grid. No other cells would fall within the proximity range.

If the receiving UE determined that it was located exactly on one of the lines parallel to the sides of the cell, and passing directly through the center of the cell, it would know that the sending UE must have been within either the same cell of the predetermined grid or the one neighboring cell closest to its position.

In the more general case, there will be four cells within the proximity range of the receiving UE, namely the cell in which the UE is located, plus the three other cells that join that cell at the corner closest to which the UE is located. Thus, in the situation illustrated in FIG. 8, the UE 812 is located closest to the corner 818 of the cell 814, and so (in addition to the cell 814) the cells 820, 822, 824 also lie within the proximity range of the UE 812.

Therefore, in step 704 of the process shown in FIG. 7, the UE determines in which grid cell it is currently located and determines which neighboring cells fall within its proximity range, and it computes the identifiers of all these grid cells.

In step 706, the UE calculates at least one message integrity code based on the grid location information of a cell identified in step 704. The calculation of the message integrity code is performed using the same algorithm and the message content retrieved from the received message.

In step 708, the UE determines whether the calculated message integrity code matches the message integrity code in the received discovery message.

If so, this indicates that the message identity code calculated by the sending UE and transmitted with the discovery message must have been calculated with the same location information as used by the receiving UE. This therefore indicates that the sending UE must have been located within one of the cells found in step 704 to have been within the proximity range of the receiving UE.

Thus, in step 710, the receiving UE takes suitable action, for example acting on the received proximity service discovery message only if the calculated message integrity code matches the message integrity code in the received discovery message.

Step 704 potentially involves identifying multiple cells, and it may be necessary to calculate message integrity codes based on identities of all of those cells, and to check all of those message identity codes against the received message integrity code. This can be achieved by calculating message integrity codes based on the identities of all of those cells, and then sequentially checking those message identity codes against the received message integrity code, or by calculating one message integrity code based on the identity of one of the cells, and checking that message identity code against the received message integrity code, and repeating those two steps as often as necessary until all of the message identity codes have been calculated and checked or until a match is found.

In embodiments, a grid may be chosen in which cells have sides that are slightly over twice the range of the proximity service. In this scenario, a receiver UE needs to perform a maximum of 4 trials to obtain an MIC match in the worst case. Choosing a grid with smaller cells (that is with sides smaller than double the range) will worsen this worst case, and may require that a receiver UE needs to perform more than 4 trials to obtain an MIC match for some positions of the sender and the receiver.

On the other hand, choosing a grid with bigger cells does not improve this worst case because, regardless of the size of the grid cells, whenever a receiver UE is close to one of the corners of its current grid cell, it is possible that the received discovery message has originated in one of the 3 other grid cells that meet in that corner (although the worst case does become less probable as the size of the cells is increased). However, choosing a grid with large cell sizes makes it possible for an attacker to perform a tunneling attack (detecting a broadcast discovery message and retransmitting it from a different location to deceive a receiving UE), even within the same grid cell.

Although predetermined grids have been described, with square cells, it is also possible to use a grid based on radio areas such as the eNodeB cells or the tracking areas.

Thus protection is provided against replay attacks, having the advantage of not requiring modifying the discovery message format, and without exposing any information about the location of the UE.

Figure 9:
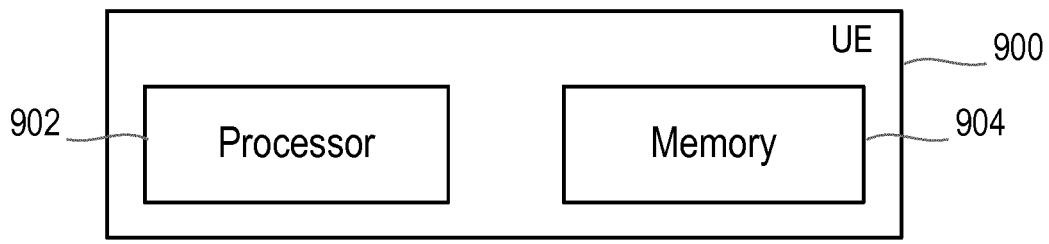
FIG. 9 illustrates a terminal device in the network of FIG. 1.

FIG. 9 shows a terminal device (UE) 900 that can be adapted or configured to operate according to one or more of the non-limiting example embodiments described. The UE 900 comprises a processor or processing unit 902 that controls the operation of the UE 900. The UE 900 also comprises a memory or memory unit 804 that is connected to the processing unit 902 and that contains instructions or computer code executable by the processing unit 902 and other information or data required for the operation of the UE 900 in accordance with the methods described herein. The terminal device is also referred to herein as a mobile station (MS).

Figure 10:
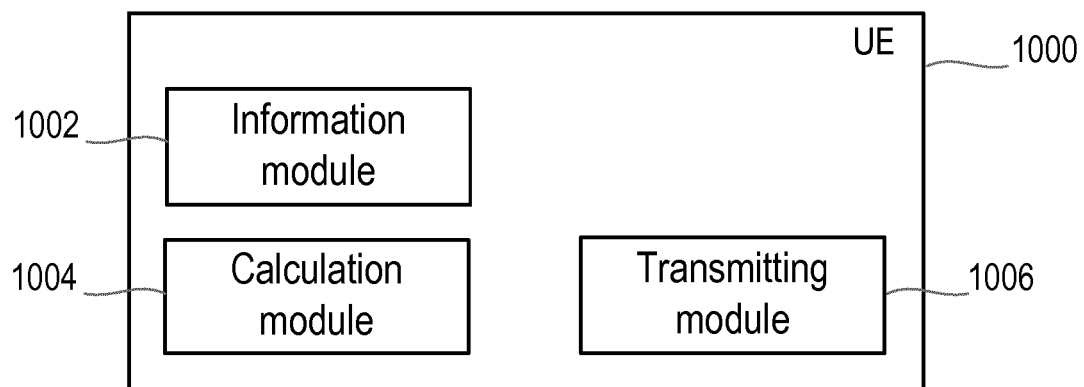
FIG. 10 illustrates a terminal device in the network of FIG. 1.
Figure 11:
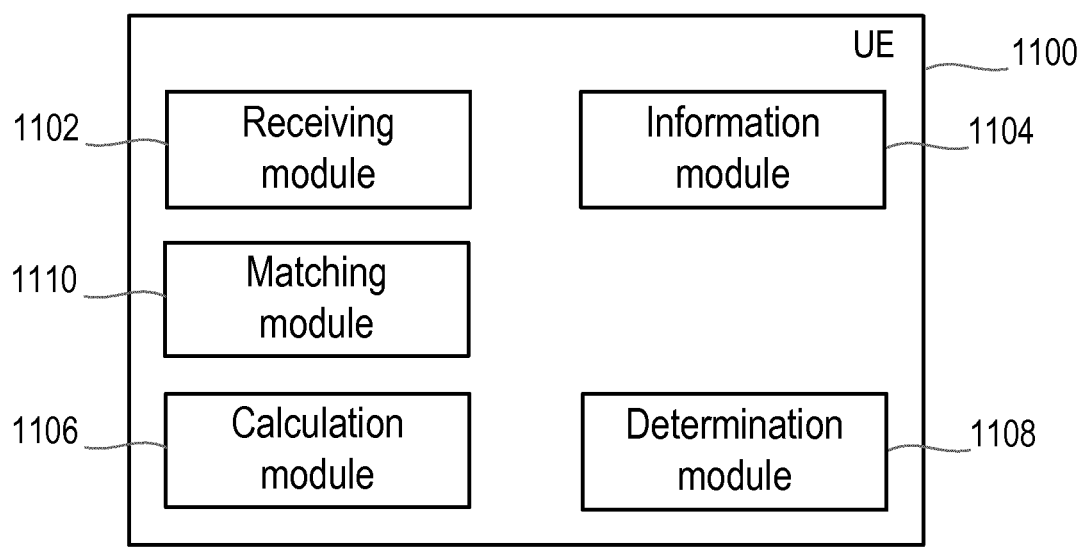
FIG. 11 illustrates a terminal device in the network of FIG. 1.
Figure 12:
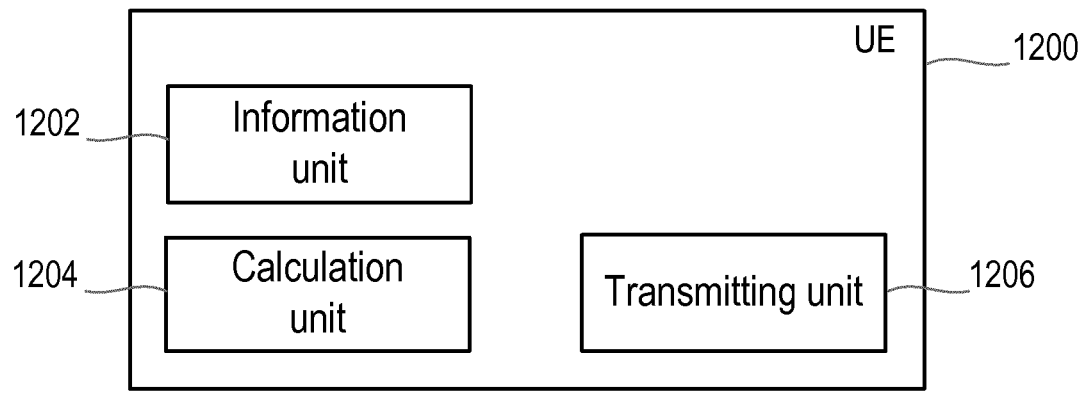
FIG. 12 illustrates a terminal device in the network of FIG. 1.
Figure 13:
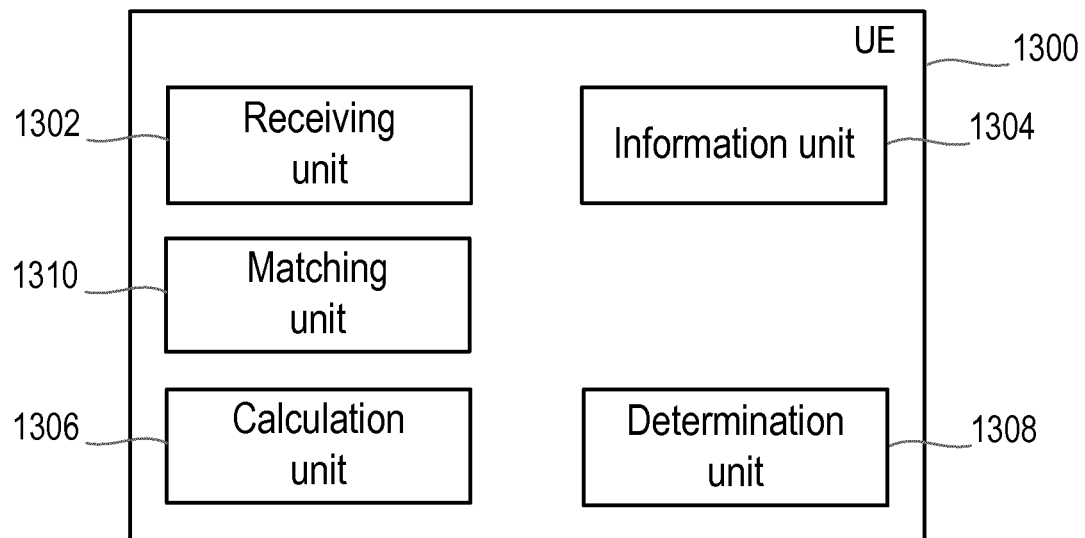
FIG. 13 illustrates a terminal device in the network of FIG. 1.

FIGS. 10, 11, 12 and 13 illustrate functional units in other embodiments of devices or nodes 1000, 1100, 1200 and 1300 which may execute any of the methods described herein, for example according to computer readable instructions received from a computer program. It will be understood that the modules illustrated in FIGS. 10 and 11 are software implemented functional units, and may be realised in any appropriate combination of software modules. It will be understood that the units illustrated in FIGS. 12 and 13 are hardware implemented functional units, and may be realised in any appropriate combination of hardware units.

FIG. 10 illustrates a terminal device (UE) 1000 according to embodiments. The terminal device 1000 comprises an information module 1002 for obtaining grid location information relating to a cell of a predetermined grid in which the terminal device is located; a calculation module 1004 calculating a message integrity code based on the grid location information; and a transmitting module 1006 for transmitting a proximity service discovery message, wherein the discovery message includes the calculated message integrity code and does not include the grid location information.

FIG. 11 illustrates a terminal device (UE) 1100 according to embodiments. The terminal device 1100 comprises a receiving module 1102 for receiving a proximity service discovery message containing a message integrity code; an information module 1104 for obtaining grid location information relating to at least one cell of a predetermined grid within a predetermined distance of a location of the terminal device; a calculation module 1106 for calculating at least one message integrity code based on the grid location information; a determination module 1108 for determining whether a calculated message integrity code matches the message integrity code in the received discovery message; and a matching module 1110 for acting on the received proximity service discovery message only if a calculated message integrity code matches the message integrity code in the received discovery message.

FIG. 12 illustrates a terminal device (UE) 1200 according to embodiments. The terminal device 1200 comprises an information unit 1202 for obtaining grid location information relating to a cell of a predetermined grid in which the terminal device is located; a calculation unit 1204 calculating a message integrity code based on the grid location information; and a transmitting unit 1206 for transmitting a proximity service discovery message, wherein the discovery message includes the calculated message integrity code and does not include the grid location information.

FIG. 13 illustrates a terminal device (UE) 1300 according to embodiments. The terminal device 1300 comprises a receiving unit 1302 for receiving a proximity service discovery message containing a message integrity code; an information unit 1304 for obtaining grid location information relating to at least one cell of a predetermined grid within a predetermined distance of a location of the terminal device; a calculation unit 1306 for calculating at least one message integrity code based on the grid location information; a determination unit 1308 for determining whether a calculated message integrity code matches the message integrity code in the received discovery message; and a matching unit 1310 for acting on the received proximity service discovery message only if a calculated message integrity code matches the message integrity code in the received discovery message.

Figure 14:
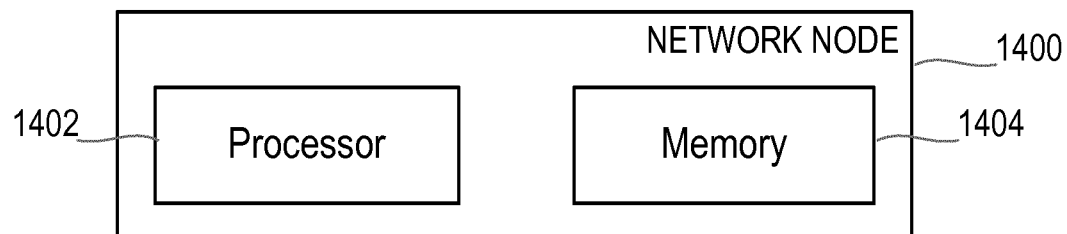
FIG. 14 illustrates a network node in the network of FIG. 1.

FIG. 14 shows a network node 1400 that can be adapted or configured to operate according to one or more of the non-limiting example embodiments described. The network node 1400 comprises a processor or processing unit 1402 that controls the operation of the network node 1400. The network node 1400 also comprises a memory or memory unit 1404 that is connected to the processing unit 1402 and that contains instructions or computer code executable by the processing unit 1402 and other information or data required for the operation of the UE 1400 in accordance with the methods described herein.

Figure 15:
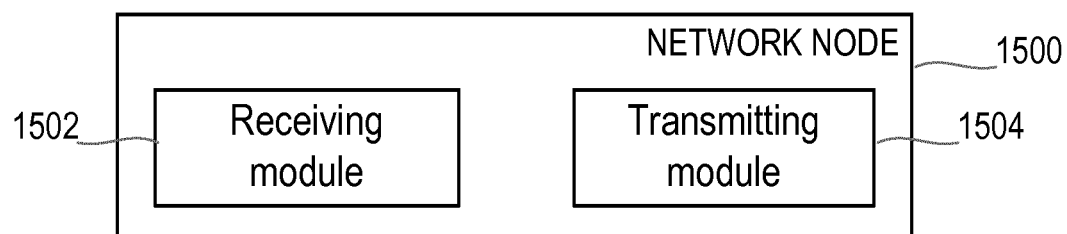
FIG. 15 illustrates a network node in the network of FIG. 1.
Figure 16:
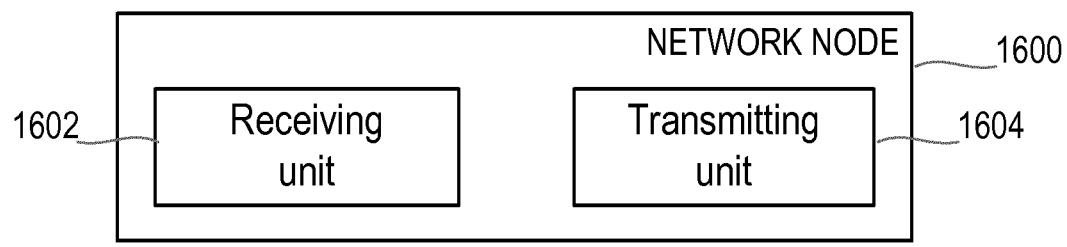
FIG. 16 illustrates a network node in the network of FIG. 1.

FIGS. 15 and 16 illustrate functional units in other embodiments of devices or nodes 1500 and 1600 which may execute any of the methods described herein, for example according to computer readable instructions received from a computer program. It will be understood that the modules illustrated in FIG. 15 are software implemented functional units, and may be realised in any appropriate combination of software modules. It will be understood that the units illustrated in FIG. 16 are hardware implemented functional units, and may be realised in any appropriate combination of hardware units.

FIG. 15 illustrates a network node 1500 according to embodiments. The network node 1500 comprises a receiving module 1502 for receiving a request for proximity service resources from a terminal device; and a transmitting module 1504 for sending a response to the terminal device granting the requested proximity service resources, with a requirement that the terminal device includes a message integrity code in any transmitted proximity service discovery message, wherein the message integrity code is calculated using grid location information relating to a cell of a predetermined grid in which the terminal device is located.

FIG. 16 illustrates a network node 1600 according to embodiments. The network node 1600 comprises a receiving unit 1602 for receiving a request for proximity service resources from a terminal device; and a transmitting unit 1604 for sending a response to the terminal device granting the requested proximity service resources, with a requirement that the terminal device includes a message integrity code in any transmitted proximity service discovery message, wherein the message integrity code is calculated using grid location information relating to a cell of a predetermined grid in which the terminal device is located.

There are thus described methods of operation of a terminal device and a network node that allow for improved security.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A method of operation of a terminal device, comprising:
receiving a proximity service discovery message containing a message integrity code;
obtaining grid location information relating to at least one cell of a predetermined grid within a predetermined distance of a location of the terminal device;
calculating at least one message integrity code based on the grid location information;
determining whether a calculated message integrity code matches the message integrity code in the received discovery message; and
acting on the received proximity service discovery message only if a calculated message integrity code matches the message integrity code in the received discovery message.

2. A method according to claim 1, wherein the predetermined distance is a multiple of a range of a proximity service to which the proximity service discovery message relates.

3. A method according to claim 1, comprising calculating the at least one message integrity code based also on a payload of the proximity service discovery message.

4. The method of claim 1, wherein the received proximity service discovery message does not include location information of a terminal device which transmitted the proximity service discovery message.

5. A terminal device for use in a communications network, the terminal device comprising a processor circuit, and a memory, the memory containing instructions executable by the processor circuit, such that the terminal device is operable to:
 receive a proximity service discovery message containing a message integrity code;
 obtain grid location information relating to at least one cell of a predetermined grid within a predetermined distance of a location of the terminal device;
 calculate at least one message integrity code based on the grid location information;
 determine whether a calculated message integrity code matches the message integrity code in the received discovery message; and
 act on the received proximity service discovery message only if a calculated message integrity code matches the message integrity code in the received discovery message.

6. A terminal device according to claim 5, wherein the predetermined distance is a multiple of a range of a proximity service to which the proximity service discovery message relates.

7. A terminal device according to claim 5, the memory contains further instructions executable by the processor circuit, such that the terminal device is operable to calculate the at least one message integrity code based also on a payload of the proximity service discovery message.

8. The terminal device of claim 5, wherein the received proximity service discovery message does not include location information of a terminal device which transmitted the proximity service discovery message.

9. A method of operation of a network node, comprising:
 receiving a request for proximity service resources from a terminal device; and
 sending a response to the terminal device granting the requested proximity service resources, with a requirement that the terminal device includes a message integrity code in any transmitted proximity service discovery message, wherein the message integrity code is calculated using grid location information relating to a cell of a predetermined grid in which the terminal device is located.

10. A method according to claim 9, comprising informing the terminal device of the predetermined grid.

11. A network node for use in a communications network, the network node comprising a processor circuit, and a memory, the memory containing instructions executable by the processor circuit, such that the network node is operable to:
 receive a request for proximity service resources from a terminal device; and
 send a response to the terminal device granting the requested proximity service resources, with a requirement that the terminal device includes a message integrity code in any transmitted proximity service discovery message, wherein the message integrity code is calculated using grid location information relating to a cell of a predetermined grid in which the terminal device is located.

12. A network node according to claim 11, wherein the memory further contains instructions executable by the processor circuit, such that the terminal device is operable to: inform the terminal device of the predetermined grid.

* * * * *